United States Patent
Satomi

(10) Patent No.: US 11,039,245 B2
(45) Date of Patent: Jun. 15, 2021

(54) ECHO SUPPRESSION DEVICE, ECHO SUPPRESSION METHOD AND ECHO SUPPRESSION PROGRAM

(71) Applicant: TRANSTRON INC., Kanagawa (JP)

(72) Inventor: Yuki Satomi, Kanagawa (JP)

(73) Assignee: TRANSTRON INC., Kanagawa (JP)

( * ) Notice: Subject to any disclaimer, the term of this patent is extended or adjusted under 35 U.S.C. 154(b) by 73 days.

(21) Appl. No.: 16/605,252

(22) PCT Filed: May 15, 2018

(86) PCT No.: PCT/JP2018/018774
§ 371 (c)(1),
(2) Date: Oct. 15, 2019

(87) PCT Pub. No.: WO2018/221206
PCT Pub. Date: Dec. 6, 2018

(65) Prior Publication Data
US 2021/0144474 A1 May 13, 2021

(30) Foreign Application Priority Data

May 29, 2017 (JP) .............................. JP2017-105560

(51) Int. Cl.
*H04R 3/04* (2006.01)
*G10L 21/0232* (2013.01)
(Continued)

(52) U.S. Cl.
CPC ............ *H04R 3/04* (2013.01); *G10L 21/0232* (2013.01); *G10L 25/51* (2013.01); *G10L 2021/02082* (2013.01); *G10L 2021/02163* (2013.01)

(58) Field of Classification Search
None
See application file for complete search history.

(56) References Cited

U.S. PATENT DOCUMENTS

2002/0154761 A1* 10/2002 McLaughlin ........... H04M 9/08
　　　　　　　　　　　　　　　　　　379/388.01
2009/0010445 A1*　1/2009 Matsuo ................. H04M 9/082
　　　　　　　　　　　　　　　　　　381/66
(Continued)

FOREIGN PATENT DOCUMENTS

JP　　　　2009-94802 A　　4/2009
JP　　　　　5923705 B　　5/2016
WO　　　2010/035308 A1　　4/2010

OTHER PUBLICATIONS

WIPO, International Search Report for PCT/JP2018/018774, dated Aug. 7, 2018.

(Continued)

*Primary Examiner* — Paul W Huber

(57) ABSTRACT

A double-talk state can be accurately detected, and based on a detection result, echo can be appropriately suppressed. When a sound is output from a speaker and only the output sound is input to a microphone, a comparison is made, for each of different frequency bands, between a frequency mask generated based on a power spectrum or an amplitude spectrum for a learning signal transmitted through a transmitting signal path and a value of a power spectrum or an amplitude spectrum for an input signal input from the microphone, to detect whether there is a double-talk state. In a case of detecting that no signal is being transmitted through the transmitting signal path and that a signal is being transmitted through the receiving signal path, an echo suppressor is used to execute processing of suppressing an echo in the input signal.

9 Claims, 14 Drawing Sheets

(51) Int. Cl.
*G10L 25/51* (2013.01)
*G10L 21/0216* (2013.01)
*G10L 21/0208* (2013.01)

(56) References Cited

U.S. PATENT DOCUMENTS

| | | | | |
|---|---|---|---|---|
| 2009/0310796 A1* | 12/2009 | Seydoux | ............... | H04M 9/082 381/71.1 |
| 2011/0135105 A1* | 6/2011 | Yano | ...................... | H04B 3/235 381/66 |
| 2014/0334620 A1* | 11/2014 | Yemdji | .................... | H04R 3/02 379/406.08 |
| 2015/0086006 A1* | 3/2015 | Kawabata | ............. | H04M 9/082 379/406.05 |
| 2015/0154977 A1* | 6/2015 | Ekman | ................. | G10K 11/175 381/66 |
| 2018/0077290 A1* | 3/2018 | Zargar | .................... | G10L 25/84 |

OTHER PUBLICATIONS

WIPO, International Preliminary Report on Patentability including Written Opinion for PCT/JP2018/018774, dated Aug. 7, 2018.

Tong, Ying et al., "Acoustic echo suppression based on speech presence probability", 2016 IEEE International Conference on Digital Signal Processing (DSP), Oct. 16, 2016, pp. 35-38 (Cited in International Search Report and Written Opinion for PCT/JP2018/018774 (Cite Nos. 1 and 2 of Non-Patent Literature Documents in this list).).

European Patent Office, Extended European Search Report for European Patent Application No. 18810819.5, dated Feb. 4, 2020.

* cited by examiner

ECHO SUPPRESSION DEVICE, ECHO SUPPRESSION METHOD AND ECHO SUPPRESSION PROGRAM

TECHNICAL FIELD

The present invention relates to an echo suppression device, an echo suppression method, and an echo suppression program.

BACKGROUND ART

Patent Document 1 discloses a speech signal processing device detecting a double-talk state in which a signal is transmitted simultaneously to a receiving signal path through which a receiving signal is transmitted from a speech terminal and to a transmitting signal path through which a transmitting signal is transmitted to the speech terminal, the speech signal processing device then calculating an amount of attenuation provided by an echo suppressor based on a detection result from a double-talk detection unit and signal levels of the receiving signal path and the transmitting signal path.

CITATION LIST

Patent Document

Patent Document 1: JP 5923705 B

SUMMARY OF INVENTION

Technical Problem

However, in the speech signal processing device described in Patent Document 1, there is a problem in that determining whether a transmitting signal is included in a residual echo is difficult when the signal level of the transmitting side is low. Accordingly, the speech signal processing device described in Patent Document 1 fails to accurately detect the double-talk state and may fail to appropriately suppress echo by using the echo suppressor.

In light of the foregoing, an object of the present invention is to provide an echo suppression device, an echo suppression method, and an echo suppression program capable of accurately detecting the double-talk state and appropriately suppressing echo based on a detection result.

Solution to Problem

In order to accomplish the object, an echo suppression device according to the present invention is, for example, an echo suppression device provided in a transmitting signal path through which a signal input from a microphone of a near-end terminal including a speaker and the microphone is transmitted, the echo suppression device including a frequency mask storage unit storing a frequency mask generated based on a power spectrum or an amplitude spectrum for a learning signal transmitted through the transmitting signal path when a sound is output from the speaker and only the output sound is input to the microphone; a first spectrum calculation unit calculating an input signal spectrum that is a power spectrum or an amplitude spectrum for an input signal input from the microphone; a double-talk detection unit detecting whether there is a double-talk state in which a signal is transmitted simultaneously to the transmitting signal path and to a receiving signal path through which a signal is transmitted to the speaker, based on a result of a comparison between a value of the input signal spectrum and a value of the frequency mask for each of different frequency bands; and an echo suppressor executing processing of suppressing an echo in the input signal in a case where the double-talk detection unit detects that no signal is being transmitted through the transmitting signal path and that a signal is being transmitted through the receiving signal path.

According to the echo suppression device according to the present invention, when a sound is output from the speaker and only the output sound is input to the microphone, a comparison is made, for each frequency band, between the frequency mask generated based on the power spectrum or the amplitude spectrum for the learning signal transmitted through the transmitting signal path and the value of the power spectrum or the amplitude spectrum value for the input signal input from the microphone to detect whether there is a double-talk state. In this way, using frequency characteristics allows the double-talk state to be accurately detected even in a case where a residual echo has higher power than a voice input from the microphone (near-end voice). In addition, according to the echo suppression device according to the present invention, in a case of detecting that a signal is not transmitted through the transmitting signal path and that a signal is being transmitted through the receiving signal path, the echo suppression device is used to execute processing of suppressing echo in the input signal. This allows echo to be appropriately suppressed without degrading the near-end voice.

Here, the echo suppression device may include an echo cancellation unit canceling a residual echo, and the frequency mask may be generated based on the power spectrum or the amplitude spectrum for the learning signal in which the residual echo has been canceled by the echo cancellation unit. The first spectrum calculation unit may calculate, as the input signal spectrum, the power spectrum or the amplitude spectrum for the input signal in which the residual echo has been canceled by the echo cancellation unit. This allows the double-talk state to be accurately detected even in a case where the input signal is small.

Here, the first spectrum calculation unit may calculate, at regular intervals, the power spectrum or the amplitude spectrum for the learning signal, to determine a plurality of learning spectra, and the frequency mask storage unit may acquire, for each frequency band, a maximum value of values of the plurality of learning spectra and designate the maximum value as the frequency mask. Thus, the frequency characteristics of the residual echo can be accurately stored.

Here, the double-talk detection unit may compare a second threshold with a signal level of a reference signal transmitted through the receiving signal path, count an excess number that is a number of frequency bands in which the value of the input signal spectrum is larger than the value of the frequency mask, and detect that no signal is being transmitted through the transmitting signal path and that a signal is being transmitted through the receiving signal path in a case where the excess number is smaller than or equal to a first threshold and the signal level of the reference signal is higher than or equal to the second threshold. This allows the double-talk state to be accurately detected.

Here, the double-talk detection unit may compare a second threshold with a signal level of a reference signal transmitted through the receiving signal path and detect that no signal is being transmitted through the transmitting signal path and that a signal is being transmitted through the receiving signal path in a case where, for frequency bands in which the value of the input signal spectrum is not larger than the value of the frequency mask, the signal level of the reference signal is higher than or equal to the second threshold. Thus, the double-talk state can be accurately detected for each frequency band, and echo suppression processing can be enabled for each frequency band.

Here, the echo suppression device may include a second spectrum calculation unit calculating a reference signal spectrum that is a power spectrum or an amplitude spectrum of a reference signal transmitted through the receiving signal path, and the double-talk detection unit may compare the value of the reference signal spectrum with a third threshold, count an excess number that is a number of frequency bands in which the value of the input signal spectrum is larger than the value of the frequency mask, and detect that no signal is being transmitted through the transmitting signal path and that a signal is being transmitted through the receiving signal path in a case where the excess number is smaller than or equal to a first threshold and where a frequency band is present in which the value of the reference signal spectrum is larger than the third threshold. This allows the double-talk state to be accurately detected.

Here, the echo suppression device may include a second spectrum calculation unit calculating a reference signal spectrum that is a power spectrum or an amplitude spectrum of a reference signal transmitted through the receiving signal path, and the double-talk detection unit may compare the value of the reference signal spectrum with a third threshold, and for a frequency band in which the value of the input signal spectrum is smaller than the value of the frequency mask and in which the value of the input signal spectrum is not larger than the value of the frequency mask, detect that no signal is being transmitted through the transmitting signal path and that a signal is being transmitted through the receiving signal path. Thus, the double-talk state can be accurately detected for each frequency band, and echo suppression processing can be enabled for each frequency band.

In order to accomplish the object described above, an echo suppression method according to the present invention is, for example, an echo suppression method including the steps of, when a sound is output from a speaker of a near-end terminal and only the output sound is input to a microphone of the near-end terminal, generating a frequency mask based on a power spectrum or an amplitude spectrum for a learning signal transmitted through a transmitting signal path through which a signal input from the microphone is transmitted and storing the generated frequency mask; calculating an input signal spectrum that is a power spectrum or an amplitude spectrum for an input signal input from the microphone, comparing, for each of different frequency bands, a value of the calculated input signal spectrum with a value of the stored frequency mask to detect whether there is a double-talk state in which a signal is transmitted simultaneously to a transmitting signal path through which a signal input from the microphone is transmitted and to a receiving signal path through which a signal is transmitted to the speaker; and executing echo suppress processing of suppressing an echo in the input signal in a case of detecting that no signal is being transmitted through the transmitting signal path and that a signal is being transmitted through the receiving signal path.

In order to accomplish the object described above, an echo suppression program according to the present invention is, for example, an echo suppression program provided in a transmitting signal path through which a signal input from a microphone of a near-end terminal including a speaker and the microphone is transmitted, the program causing a computer to function as a frequency mask storage unit storing a frequency mask generated based on a power spectrum or an amplitude spectrum for a learning signal transmitted through the transmitting signal path when a sound is output from the speaker and only the output sound is input to the microphone; a first spectrum calculation unit calculating an input signal spectrum that is a power spectrum or an amplitude spectrum for an input signal input from the microphone; a double-talk detection unit detecting whether there is a double-talk state in which a signal is transmitted simultaneously to the transmitting signal path and to a receiving signal path through which a signal is transmitted to the speaker, based on a result of a comparison between a value of the input signal spectrum and a value of the frequency mask for each of different frequency bands; and an echo suppressor executing processing of suppressing an echo in the input signal in a case where the double-talk detection unit detects that no signal is being transmitted through the transmitting signal path and that a signal is being transmitted through the receiving signal path.

Advantageous Effects of Invention

According to the present invention, the double-talk state can be accurately detected, and based on the detection result, echo can be appropriately suppressed.

DESCRIPTION OF EMBODIMENTS

Embodiments of the present invention will be described below in detail with reference to the drawings. An echo suppression device is a device suppressing echo generated during a telephone call in a voice communication system.

First Embodiment

Figure 1:
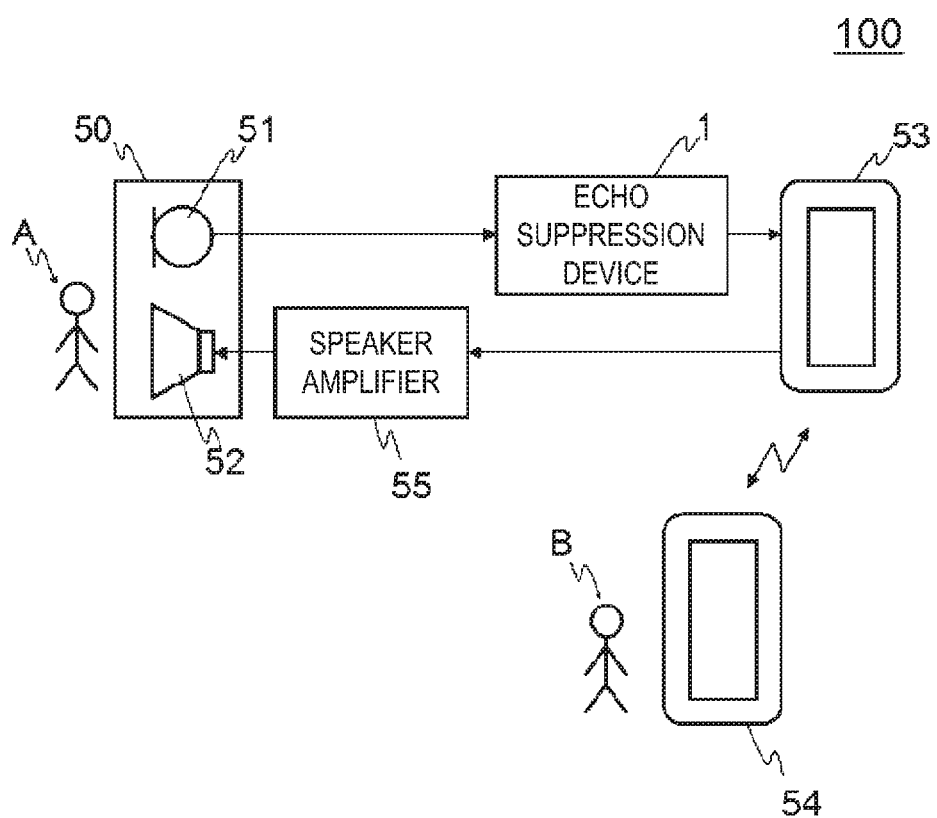
FIG. 1 is a diagram schematically illustrating a voice communication system 100 provided with an echo suppression device 1 according to a first embodiment.

FIG. 1 is a diagram schematically illustrating a voice communication system 100 provided with an echo suppression device 1 according to a first embodiment. The voice communication system 100 primarily includes a terminal 50 including a microphone 51 and a speaker 52, two cell phones 53 and 54, a speaker amplifier 55, and the echo suppression device 1.

The voice communication system 100 is a system in which a user (a user A on a near-end side) utilizing the terminal 50 (near-end terminal) is in voice communication with a user (user B on a far-end side) utilizing the cell phone 54 (far-end terminal). A voice signal input via the cell phone 54 is amplified and output by the speaker 52, and a voice emitted by the user on the near-end side is collected by the microphone 51 and transmitted to the cell phone 54. Thus, the user A can make an amplified voice call (hands-free call) without holding the cell phone 53. The cell phone 53 and the cell phone 54 are connected together by a common telephone line.

The echo suppression device 1 is provided on a transmitting signal path through which signals input via the microphone 51 are transmitted from the terminal 50 to the cell phone 53.

The echo suppression device 1 may be configured as a dedicated board mounted on a speech terminal or the like (for example, an on-board device, a conference system, or a mobile terminal) in the voice communication system 100. Additionally, the echo suppression device 1 may include, for example, computer hardware and software (echo suppression program). An echo suppression program may be stored in advance in an HDD as a storage medium built-in in equipment such as a computer, a ROM in a microcomputer including a CPU, or the like and may be installed from the storage medium or the like into a computer. Additionally, the echo suppression program may be temporarily or permanently stored (memorized) in a removable storage medium such as a semiconductor memory, a memory card, an optical disc, a magneto-optical disk, a magnetic disk, or the like.

Figure 2:
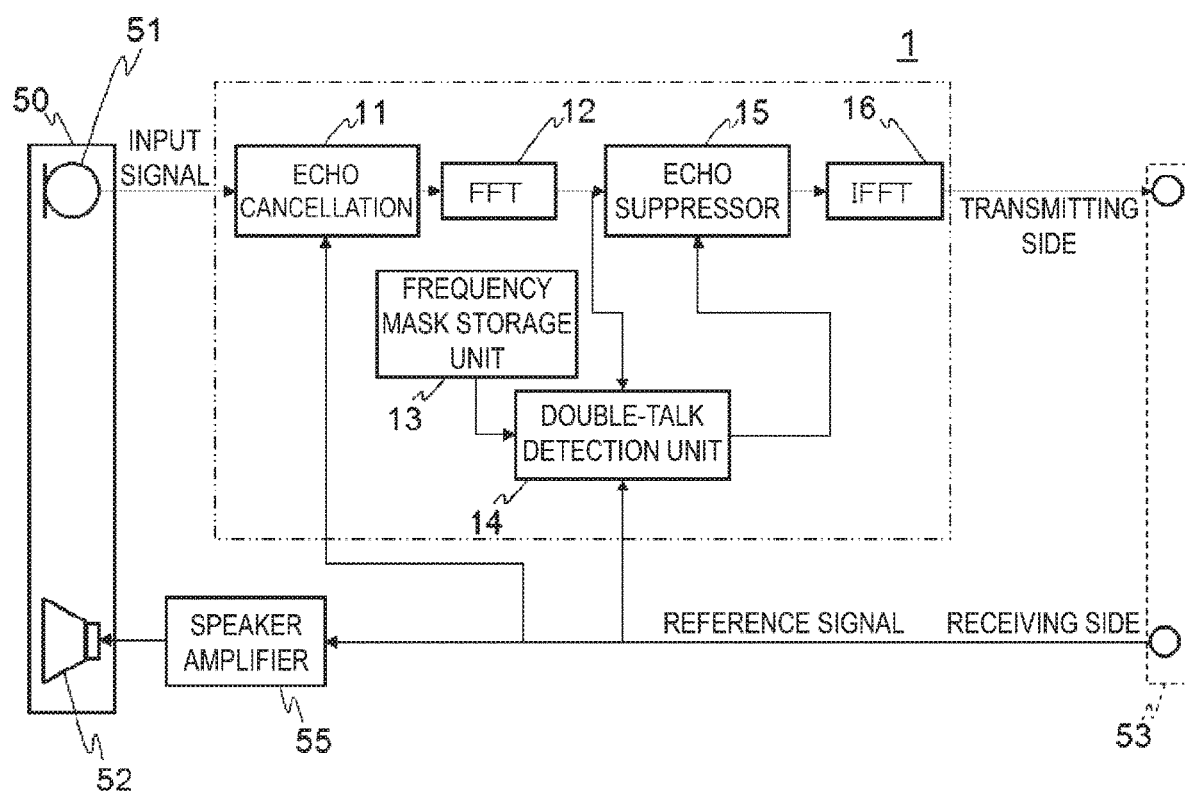
FIG. 2 is a block diagram illustrating a general configuration of the echo suppression device 1.

FIG. 2 is a block diagram illustrating a general configuration of the echo suppression device 1. The echo suppression device 1 mainly includes an echo cancellation unit 11, a frequency analyzer (FFT unit) 12, a frequency mask storage unit 13, a double-talk detection unit 14, an echo suppressor 15, and a restoration unit (IFFT unit) 16. In FIG. 2, an upper signal path is a transmitting signal path through which input signals input from the microphone 51 are transmitted, and a lower signal path is a receiving signal path through which signals are transmitted to the speaker 52.

The echo cancellation unit 11, for example, uses an adaptive filter to cancel residual echo. The echo cancellation unit 11 updates a filter coefficient according to a given procedure to generate a pseudo echo signal from a signal transmitted through the receiving signal path and subtracts the pseudo echo signal from a signal transmitted through the transmitting signal path to cancel residual echo. Note that adaptive filters are well known, and thus description of the adaptive filter is omitted.

Note that in the present embodiment, an adaptive filter is applied to the echo cancellation unit 11, but any other known echo cancellation technique may be applied to the echo cancellation unit 11.

The frequency analyzer (FFT unit) 12 performs a Fast Fourier Transform (FFT) on the signal transmitted through the transmitting signal path. The FFT unit 12 processes the signal passed through the echo cancellation unit 11. The FFT unit 12 divides the power that is an average energy per unit time into power in different frequency bands and calculates a power spectrum in which the power in each frequency band is expressed as a function of frequency.

The power spectrum is a graph indicating power in each frequency band (frequency resolution $\Delta f$) determined by performing FFT analysis on the power of a time signal x(t), the graph indicating the frequency on the horizontal axis. Here, the power is the square of the amplitude and is expressed by Equation (1).

[Equation 1]

$$P[i] = |X[i]|^2 = X[i]^* X[i] \quad (1)$$

Note that, in the present invention, instead of the power spectrum, an amplitude spectrum can be used in which the vertical axis indicates the amplitude obtained by taking the square root of the power and in which the horizontal axis indicates the frequency. The present embodiment will be described using the power spectrum, but the power spectrum in the present embodiment can be replaced with the amplitude spectrum.

The FFT unit 12 calculates the power spectrum for the input signal (hereinafter referred to as the input signal spectrum) at every unit time. Additionally, a power spectrum for a learning signal (described below in detail) is calculated.

Note that, in the present embodiment, the FFT unit 12 performs the frequency analysis using the Fast Fourier Transform, but instead of the Fast Fourier Transform, a Discrete Fourier Transform (DFT) can be used for the frequency analysis.

The frequency mask storage unit 13 generates a frequency mask based on the power spectrum for the learning signal calculated by the FFT unit 12 and stores the generated frequency mask. The generation of the frequency mask will be described in detail below. The frequency mask is generated in advance before the echo suppression device 1 performs echo suppression processing.

Figure 3:
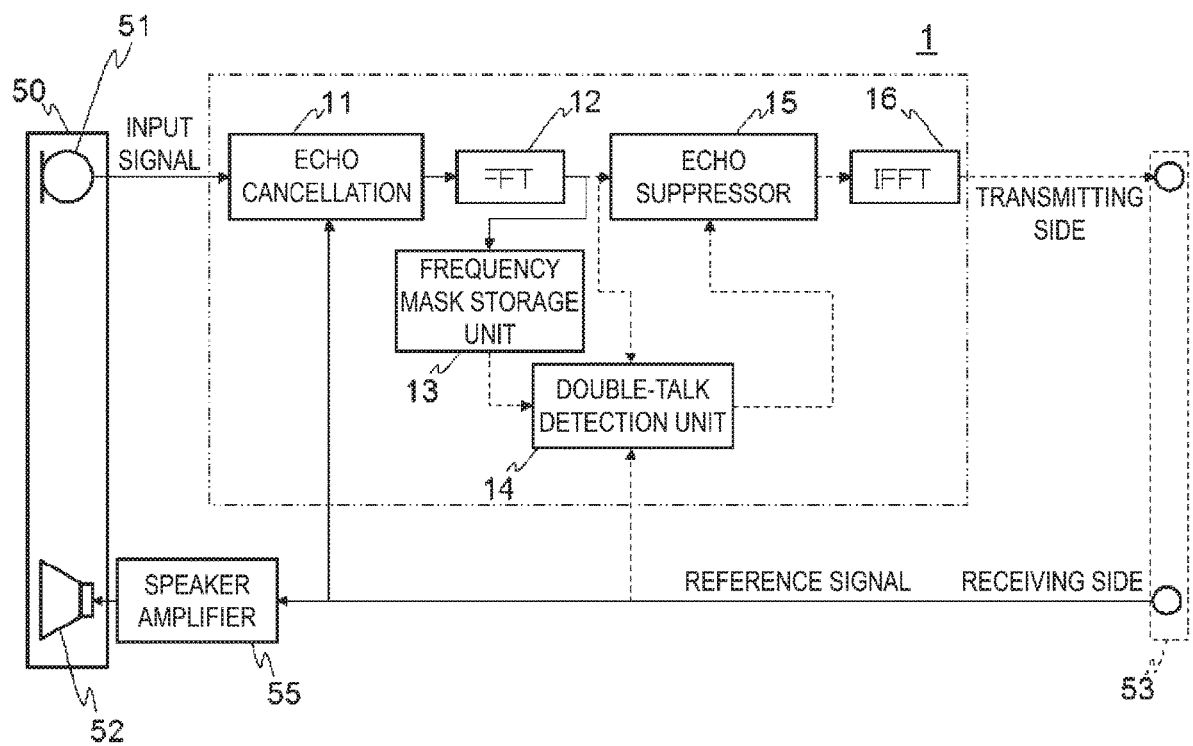
FIG. 3 is a diagram illustrating a signal flow in a case where a frequency mask is generated in the echo suppression device 1.

FIG. 3 is a diagram illustrating a signal flow in a case where a frequency mask is generated in the echo suppression device 1. In FIG. 3, solid lines are used to express components through which a signal is transmitted when a frequency mask is generated, and dotted lines are used to other components.

First, after the adaptive filter in the echo cancellation unit 11 finishes sufficient learning, one-sided speech on a far-end side (single talk) is repeated in which sound is output from the speaker 52 and in which only the sound output from the speaker 52 is input to the microphone 51. A signal transmitted through the transmitting signal path during the single talk is used as a learning signal. In the echo suppression device 1, the learning signal corresponds to a signal in which residual echo has been canceled by the echo cancellation unit 11.

Figure 4:
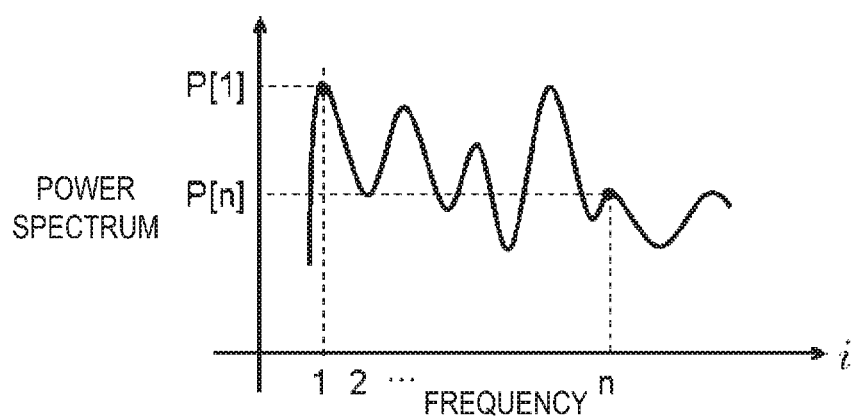
FIG. 4 is an example of a learning spectrum at a time t1.

The learning signal is input to the FFT unit 12. The FFT unit 12 calculates, at regular intervals, the power spectrum for the learning signal, to determine a plurality of learning spectra. Here, the regular intervals are predetermined time regions arbitrarily defined and are designated as times t1, t2, t3, .... FIG. 4 is an example of a learning spectrum at a time t1. Hereinafter, the value on the vertical axis in the power spectrum is referred to as the value of the power spectrum.

The plurality of learning spectra calculated at respective regular intervals is input into the frequency mask storage 13. The frequency mask storage unit 13 stores the input plurality of learning spectra.

Figure 5:
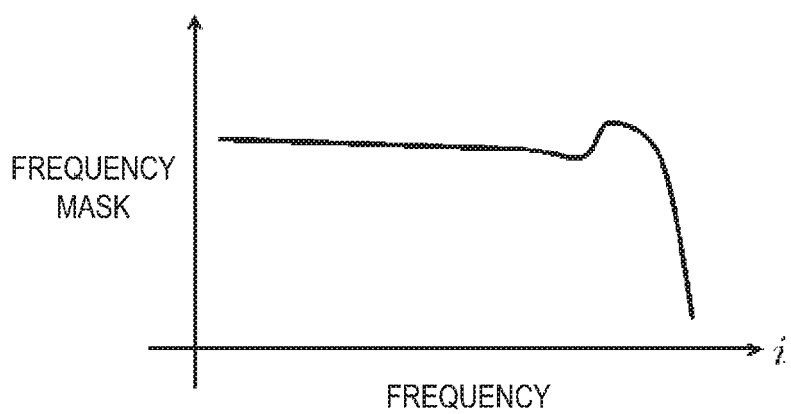
FIG. 5 is an example of a frequency mask when a plurality of learning spectra including the learning spectrum illustrated in FIG. 4 are input.

The frequency mask storage unit 13 acquires, for each of different frequency bands, the maximum value of the values of the input plurality of learning spectra and uses the maximum value as a frequency mask. FIG. 5 is an example of a frequency mask in a case where a plurality of learning spectra including the learning spectrum illustrated in FIG. 4 are input. The frequency mask storage unit 13 stores the frequency mask. Thus, the frequency characteristics of residual echo can be accurately stored.

The description will now return to FIG. 2. The double-talk detection unit 14 compares, for each frequency band, the value of the input signal spectrum input from the FFT unit 12 with the value of the frequency mask stored in the frequency mask storage unit 13. Then, the double-talk detection unit 14 detects, based on comparison results, whether there is a double-talk state in which a signal is transmitted simultaneously to the transmitting signal path and to the receiving signal path. The double-talk detection unit 14 executes processing of detecting whether there is a double-talk state, at every unit time when the input signal spectrum is calculated.

Hereinafter, a method for detecting whether there is a double-talk state, the method being performed by the double-talk detection unit 14, will be described in detail. First, the double-talk detection unit 14 compares, for each frequency band, the value of the input signal spectrum with the value of the frequency mask and counts the number of frequency bands in which the value of the input signal spectrum is larger than the value of the frequency mask (hereinafter referred to as the "excess number"). The double-talk detection unit 14 determines whether the excess number is equal to or smaller than a prepared threshold I (corresponding to a first threshold). Note that the threshold I can be set to any value.

Additionally, the double-talk detection unit 14 acquires a reference signal transmitted from the cell phone 53 to the terminal 50 and determines the signal level of the reference signal. The reference signal is acquired from the receiving signal path. The double-talk detection unit 14 compares the signal level of the reference signal with a prepared threshold II (corresponding to a second threshold). Note that the threshold II can be set to any value.

Figure 6:
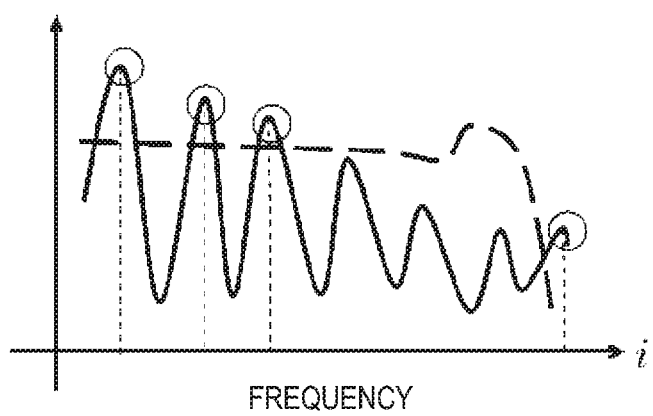
FIG. 6 is a diagram schematically illustrating a comparison between the value of an input signal spectrum and the value of a frequency mask.
Figure 7:
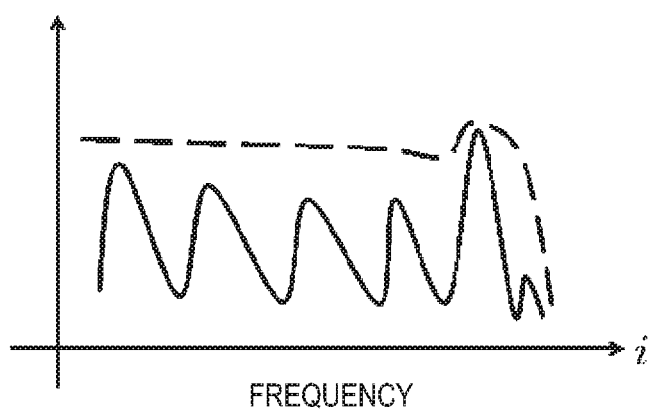
FIG. 7 is a diagram schematically illustrating a comparison between the value of the input signal spectrum and the value of the frequency mask.

FIGS. 6 and 7 are diagrams schematically illustrating a comparison between the value of the input signal spectrum and the value of the frequency mask. In FIGS. 6 and 7, a solid line indicates the input signal spectrum, and a dashed line indicates the frequency mask.

In a case illustrated in FIG. 6, the excess number is more than or equal to the threshold I (e.g., threshold I=3), and thus, the double-talk detection unit 14 detects that sound is being input from the microphone 51 and that a signal is transmitted through the transmitting signal path (near-end speech is present).

In a case illustrated in FIG. 7, the excess number is smaller than or equal to the threshold I, and thus, the double-talk detection unit 14 detects that no sound is being input from the microphone 51 and that no signal is being transmitted through the transmitting (no near-end speech is present).

In a case where the excess number is smaller than or equal to the threshold I and the signal level of the reference signal is higher than or equal to a prepared threshold II (corresponding to a second threshold), the double-talk detection unit 14 detects single talk, that no signal is being transmitted through the transmitting signal path and that a signal is being transmitted through the receiving signal path (far-end speech is present), and not the double-talk state.

The description will now return to FIG. 2. The echo suppressor 15 performs echo suppress processing (processing of strongly suppressing echo) on the input signal passed through the FFT unit 12. The echo suppressor 15 enables the echo suppress processing in a case where single talk with only far-end speech is present and where there is no double-talk state and otherwise disables the echo suppress processing. The echo suppress processing is well known, and thus, detailed description of the processing is omitted.

The result of detection of whether there is a double-talk state is input from the double-talk detection unit 14 to the echo suppressor 15 at every unit time. Thus, the echo suppressor 15 switches between enabling and disabling of the echo suppress processing at every unit time.

The restoration unit (IFFT unit) 16 performs Inverse Fast Fourier Transform (IFFT, Inverse FFT) on the input signal passed through the FFT unit 12. Note that the restoration unit (IFFT unit) 16 can use Inverse Discrete Fourier Transform (IDFT) instead of the IFFT.

According to the present embodiment, a difference in frequency characteristics between an input signal based on near-end speech and a residual echo resulting from far-end speech is focused on. The frequency characteristics of the residual echo are stored as a frequency mask, and the frequency characteristics of the input signal are compared with the frequency mask to accurately detect a double-talk state. When there is no double-talk state, the echo suppress processing is enabled to allow echo to be reliably suppressed without degrading near-end voice (voice input from the microphone 51).

For example, with a known method for determining whether the signal corresponds to a near-end voice or a residual echo based on voice power, there is a problem in that determining occurrence of double talk is difficult in a case where the residual echo has higher power than the input signal. In contrast, in the present embodiment, use of the frequency characteristics allows detection of whether there is a double-talk state even in a case where the residual echo has higher power than the input signal.

In addition, according to the present embodiment, the FFT unit 12 uses the learning signal in which the residual echo has been canceled by the echo cancellation unit 11 to generate a frequency mask, and thus, the double-talk state can be accurately detected even in cases where the input signal is small. The echo cancellation unit 11 cancels residual echo and does not act on the input signal. Thus, by generating a frequency mask using the learning signal in which the residual echo has been canceled by the echo cancellation unit 11, the value of the frequency mask is reduced. Accordingly, even with a small input signal, the value of the input signal spectrum is likely to be larger than the value of the frequency mask, allowing the double-talk detection unit 14 to more accurately detect the presence of near-end speech.

Second Embodiment

The first embodiment of the present invention includes the echo cancellation unit 11, but the echo cancellation unit 11 is not essential. The second embodiment is a configuration not including the echo cancellation unit 11. Now, an echo suppression device 2 according to the second embodiment will be described. Note that the same components as those of the echo suppression device 1 according to the first embodiment are denoted by the same reference numerals, and description of the components is omitted.

Figure 8:
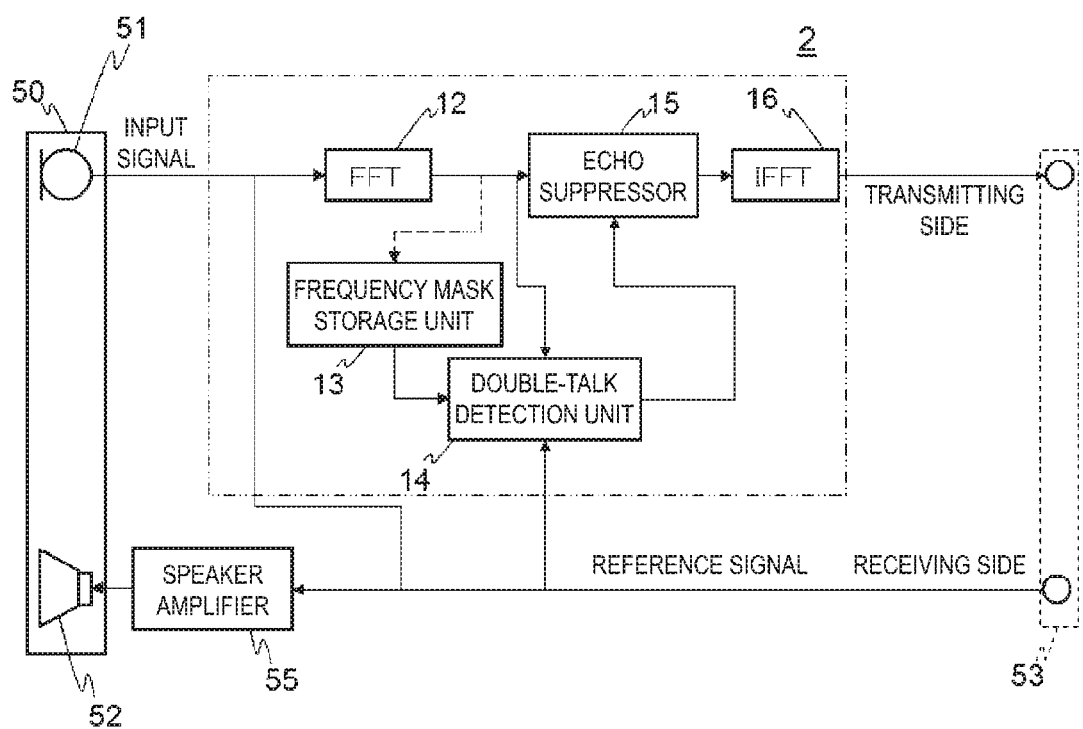
FIG. 8 is a block diagram illustrating a general configuration of an echo suppression device 2.

FIG. 8 is a block diagram illustrating a general configuration of the echo suppression device 2. The echo suppression device 2 mainly includes the FFT unit 12, the frequency mask storage unit 13, the double-talk detection unit 14, the echo suppressor 15, and the IFFT unit 16.

The echo suppression device 2 does not include the echo cancellation unit 11, and thus, a signal transmitted through the receiving signal path during single talk (the signal in which no residual echo has been canceled) is used as a learning signal. The FFT unit 12 generates a frequency mask based on a power spectrum (or amplitude spectrum) for a learning signal in which no residual echo has been canceled and stores the frequency mask.

Even with the learning signal in which no residual echo has been canceled as described above, the frequency characteristics of the input signal are compared with the frequency mask to allow accurate detection of the double-talk state. However, in order to accurately detect the double-talk state even with a small input signal, a frequency mask is desirably generated by using the learning signal passed through the echo cancellation unit 11.

Third Embodiment

A third embodiment is a configuration in which the double-talk state is detected for each frequency band. Now, an echo suppression device 3 according to the third embodiment will be described. Note that the same components as those of the echo suppression device 1 according to the first embodiment are denoted by the same reference numerals, and description of the components will be omitted. In the present embodiment as well, as is the case with the echo suppression device 1 according to the first embodiment, the power spectrum can be replaced with the amplitude spectrum.

Figure 9:
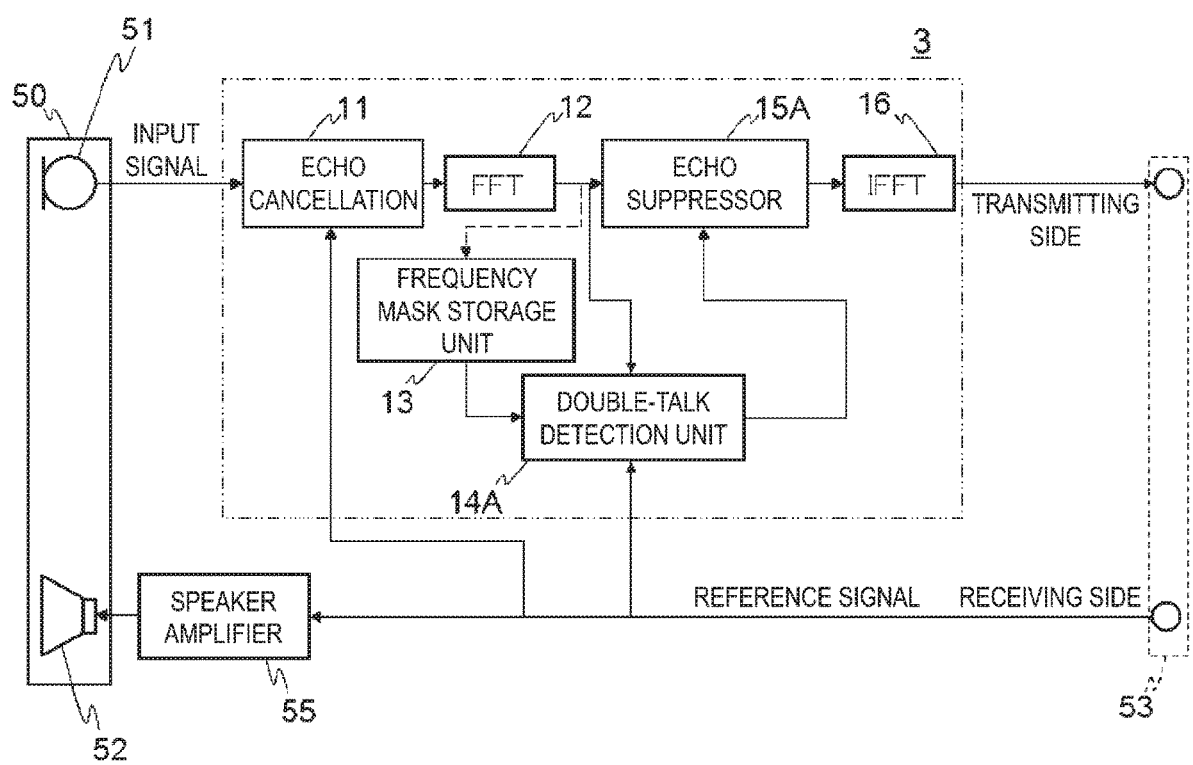
FIG. 9 is a block diagram illustrating a general configuration of an echo suppression device 3.

FIG. 9 is a block diagram illustrating a general configuration of the echo suppression device 3. The echo suppression device 3 mainly includes the echo cancellation unit 11, the FFT unit 12, the frequency mask storage unit 13, a double-talk detection unit 14A, an echo suppressor 15A, and the IFFT unit 16. In FIG. 9, an upper signal path is a transmitting signal path and a lower signal path is a receiving signal path.

The double-talk detection unit 14A detects, for each frequency band, whether there is a double-talk state. Note that the double-talk detection unit 14A performs the processing of detecting whether there is a double-talk state, at every unit time when the input signal spectrum is calculated.

Hereinafter, a method for detecting whether there is a double-talk state, the method being performed by the double-talk detection unit 14A, will be described in detail. First, the double-talk detection unit 14A compares, for each frequency band, the value of the input signal spectrum input from the FFT unit 12 with the value of the frequency mask stored in the frequency mask storage unit 13.

Additionally, the double-talk detection unit 14A acquires the reference signal transmitted from the cell phone 53 to the terminal and determines the signal level of the reference signal. The double-talk detection unit 14A compares the signal level of the reference signal with the threshold II.

Then, for frequency bands in which the value of the input signal spectrum is not larger than the value of the frequency mask, the double-talk detection unit 14A detects that single talk with only far-end speech is present and that there is no double-talk state in a case where the signal level of the reference signal is higher than or equal to the threshold II.

Figure 10:
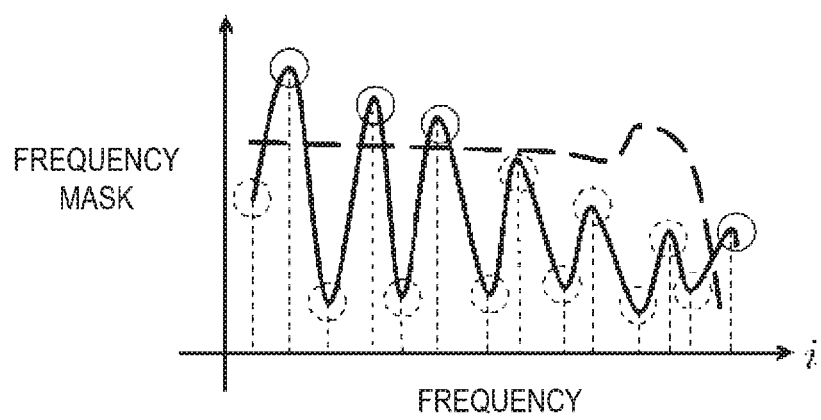
FIG. 10 is a diagram schematically illustrating a comparison between the value of an input signal spectrum and the value of a frequency mask in a case where a signal level of a reference signal is equal to or higher than a threshold II.

FIG. 10 is a diagram schematically illustrating a comparison between the value of the input signal spectrum and the value of the frequency mask in a case where the signal level of the reference signal is higher than or equal to the threshold II. In FIG. 10, a solid line indicates the input signal spectrum, and a dashed line indicates the frequency mask.

In the frequency bands circled with solid lines in FIG. 10, the value of the input signal spectrum is larger than the value of the frequency mask. Thus, for these frequency bands, the double-talk detection unit 14A detects that far-end speech is present and near-end speech is also present, i.e., there is a double-talk state.

In contrast, in frequency bands circled with dotted lines in FIG. 10, the value of the input signal spectrum is not larger than the value of the frequency mask. Thus, for this frequency band, the double-talk detection unit 14A detects that far-end speech is present, whereas no near-end speech is present and that single talk with only far-end speech and no near-end speech is present, i.e., detects that there is no double-talk state.

The description will now return to FIG. 9. The echo suppressor 15A executes echo suppress processing (processing of strongly suppressing echo) on the input signal passed through the FFT unit 12. The echo suppressor 15A enables the echo suppress processing for the frequency bands in which single talk with only far-end speech has been detected and disables the echo suppress processing for the other frequency bands. The echo suppressor 15A switches between enabling and disabling of the echo suppress processing at each unit of time.

According to the present embodiment, the double-talk state can be accurately detected for each frequency band, and the echo suppress processing can be enabled for each frequency band.

Fourth Embodiment

A fourth embodiment is a configuration using the frequency characteristics of the reference signal for detection of the double-talk state. Now, an echo suppression device 4 according to the fourth embodiment will be described. Note that the same components as those of the echo suppression devices 1 to 3 according to the first to third embodiments are denoted by the same reference numerals, and description of the components is omitted. In the present embodiment as well, as is the case with the echo suppression device 1 according to the first embodiment, the power spectrum can be replaced with the amplitude spectrum.

Figure 11:
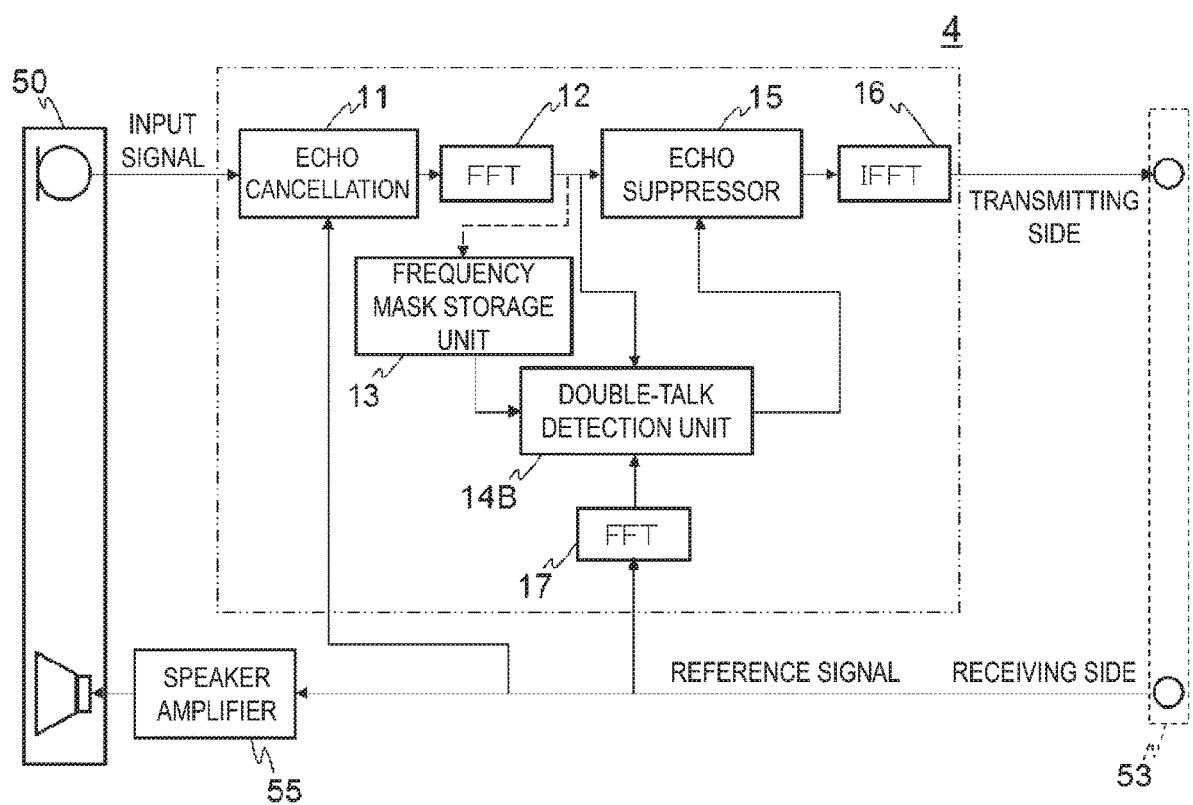
FIG. 11 is a block diagram illustrating a general configuration of an echo suppression device 4.

FIG. 11 is a block diagram illustrating a general configuration of the echo suppression device 4. The echo suppression device 4 mainly includes the echo cancellation unit 11, FFT units 12 and 17, the frequency mask storage unit 13, a double-talk detection unit 14B, the echo suppressor 15, and the IFFT unit 16. In FIG. 11, an upper signal path is the transmitting signal path and a lower signal path is the receiving signal path.

The FFT unit 17 performs a Fast Fourier Transform on the reference signal transmitted through the receiving signal path and calculates the power spectrum for the reference signal (hereinafter referred to as the reference signal spectrum) at every unit time.

The double-talk detection unit 14B detects whether there is a double-talk state, based on the input signal spectrum and the frequency mask. The double-talk detection unit 14B performs the processing of detecting whether there is a double-talk state, at every unit time when the input signal spectrum and the reference signal spectrum are calculated.

Hereinafter, a method for detecting whether there is a double-talk state, the method being performed by the detection unit 14B, will be described in detail. First, the double-talk detection unit 14B compares, for each frequency band, the value of the input signal spectrum input from the FFT unit 12 with the value of the frequency mask stored in the frequency mask storage unit 13, and counts the number (the excess number) of frequency bands in which the value of the input signal spectrum is larger than the value of the frequency mask.

Additionally, the double-talk detection unit 14B compares the reference signal spectrum input from the FFT unit 17 with a prepared threshold III (corresponding to a third threshold). Note that the threshold III can be set to any value.

Then, the double-talk detection unit 14B detects no near-end speech, but single talk with only far-end speech, and that there is no double-talk state in a case where the excess number is smaller than or equal to the threshold I and where a frequency band is present in which the value of the reference signal spectrum is larger than the threshold III.

Figure 12:
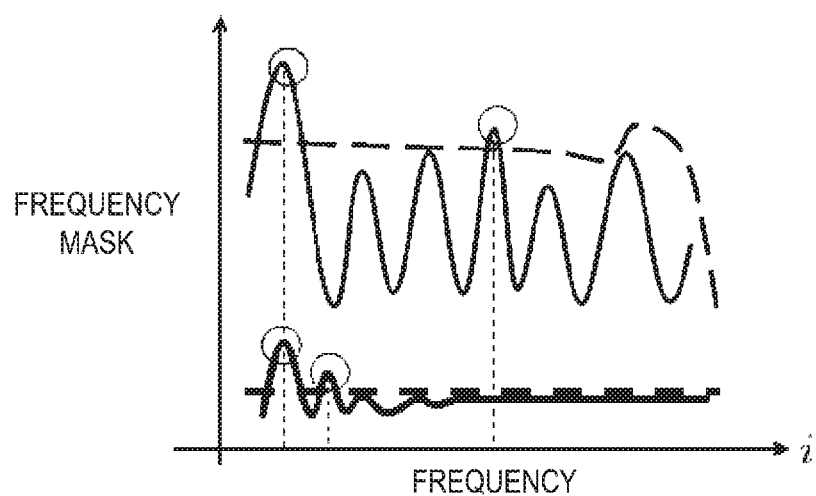
FIG. 12 is a diagram schematically illustrating a comparison between the value of an input signal spectrum and the value of a frequency mask, and a comparison between a reference signal spectrum and a threshold III.

FIG. 12 is a diagram schematically illustrating a comparison between the value of the input signal spectrum and the value of the frequency mask, and a comparison between the reference signal spectrum and the threshold III. In FIG. 12, a solid line indicates the input signal spectrum, and a dashed line indicates the frequency mask. Additionally, in FIG. 12, a thick solid line indicates the reference signal spectrum, and a thick dashed line indicates the threshold III.

In a case illustrated in FIG. 12, the excess number is smaller than or equal to the threshold I (e.g., 3). Thus, the double-talk detection unit 14B detects that no near-end speech is present. Additionally, in the case illustrated in FIG. 12, a frequency band is present in which the value of the reference signal spectrum is larger than the threshold III. Thus, the double-talk detection unit 14B detects that far-end speech is present. In other words, in the case illustrated in FIG. 12, the double-talk detection unit 14B detects that single talk with only far-end speech is present.

The description will now return to FIG. 11. The echo suppressor 15 enables the echo suppress processing for all the frequency bands of the input signal passed through the FFT unit 12 in a case where single talk with only far-end speech is present and where there is no double-talk state and otherwise disables the echo pressing process.

According to the present embodiment, by detecting the presence or absence of far-end speech based on the reference signal spectrum, the double-talk state can be more accurately detected.

Fifth Embodiment

A fifth embodiment is a configuration in which the double-talk state is detected for each frequency band. Now, an echo suppression device 5 according to the fifth embodiment will be described. Note that the same components as those of the echo suppression devices 1 to 4 according to the first to fourth embodiments are denoted by the same reference numerals, and description of the components is omitted. In the present embodiment as well, as is the case with the echo suppression device 1 according to the first embodiment, the power spectrum can be replaced with the amplitude spectrum.

Figure 13:
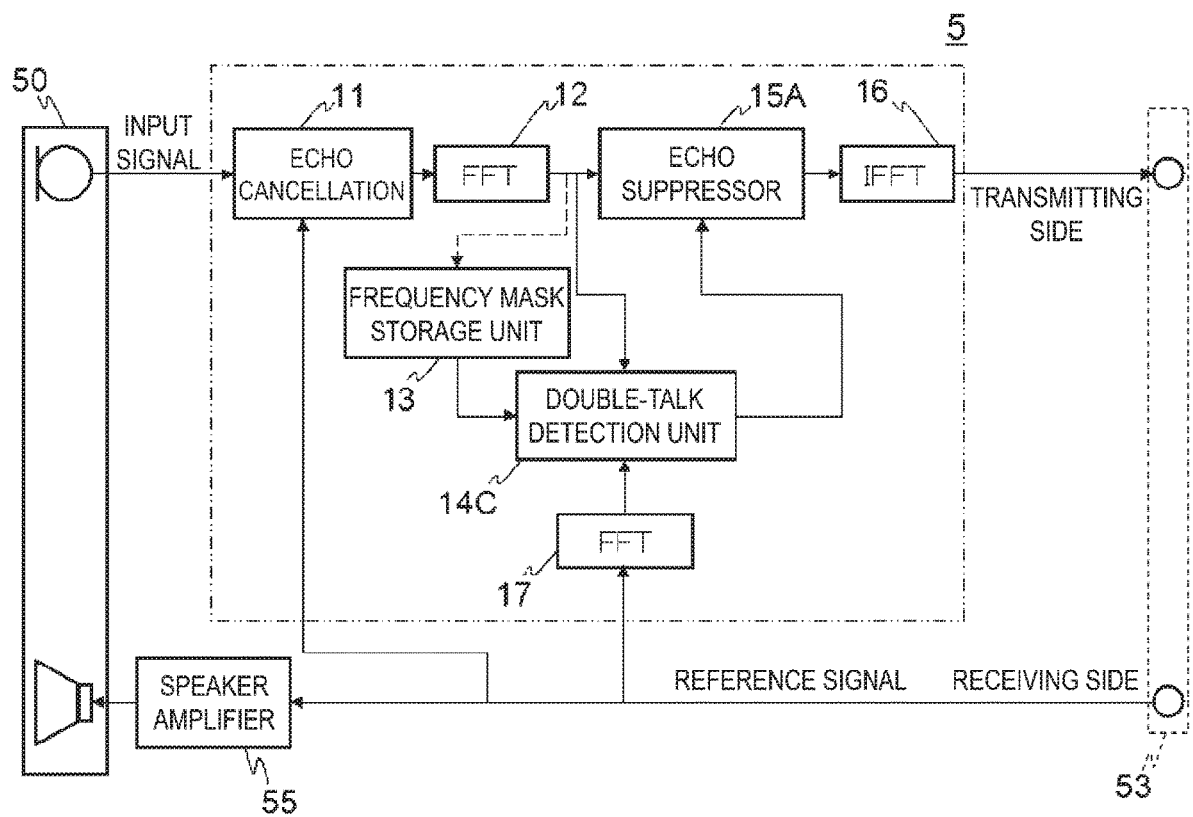
FIG. 13 is a block diagram illustrating a general configuration of an echo suppression device 5.

FIG. 13 is a block diagram illustrating a general configuration of the echo suppression device 5. The echo suppression device 5 mainly includes the echo cancellation unit 11, the FFT units 12 and 17, the frequency mask storage unit 13, a double-talk detection unit 14C, the echo suppressor 15A, and the IFFT unit 16. In FIG. 13, an upper signal path is the transmitting signal path and a lower signal path is the receiving signal path.

The double-talk detection unit 14C detects, for each frequency band, whether there is a double-talk state based on the input signal spectrum and the frequency mask. The double-talk detection unit 14C executes the processing of detecting whether there is a double-talk state, at every unit time when the input signal spectrum and the reference signal spectrum are calculated.

Hereinafter, a method for detecting whether there is a double-talk state, the method being performed by the double-talk detection unit 14C, will be described in detail. First, the double-talk detection unit 14C compares, for each frequency band, the value of the input signal spectrum input from the FFT unit 12 with the value of the frequency mask stored in the frequency mask storage unit 13. Additionally, the double-talk detection unit 14C compares the value of the reference signal spectrum input from the FFT unit 17 with the threshold III.

Then, for frequency bands in which the value of the input signal spectrum is not larger than the value of the frequency mask, the double-talk detection unit 14C detects that single talk with only far-end speech is present and that there is no double-talk state in a case where the value of the reference signal spectrum is larger than or equal to the threshold III.

Figure 14:
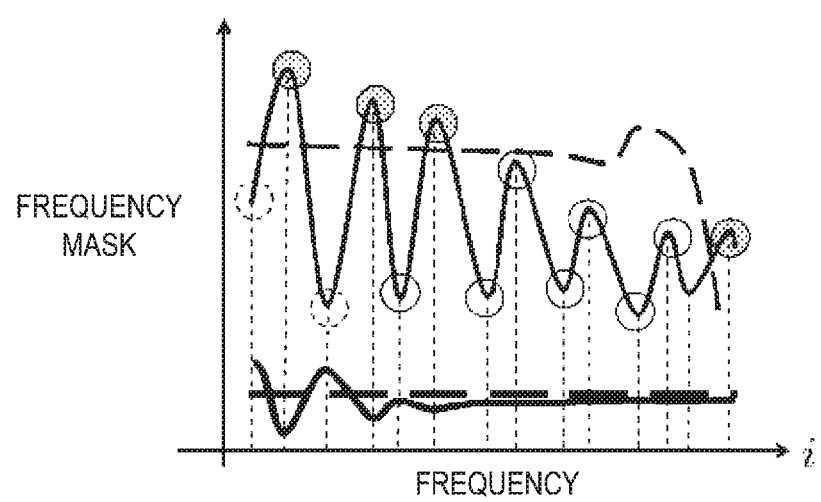
FIG. 14 is a diagram schematically illustrating a comparison between the value of an input signal spectrum and the value of a frequency mask; and a comparison between a reference signal spectrum and a threshold III.

FIG. 14 is a diagram schematically illustrating a comparison between the value of the input signal spectrum and the value of the frequency mask; and a comparison between the reference signal spectrum and the threshold III. In FIG. 14, a solid line indicates the input signal spectrum, and a dashed line indicates the frequency mask. In FIG. 14, a thick solid line indicates the reference signal spectrum, and a thick dashed line indicates the threshold III.

In FIG. 14, in frequency bands circled with solid lines and hatched, the value of the input signal spectrum is larger than the value of the frequency mask. Thus, for these frequency bands, the double-talk detection unit 14A detects that near-end speech is present.

In FIG. 14, the frequency band surrounded by the solid mark in the solid line does not exceed the value of the frequency mask. However, in these frequency bands, the value of the reference signal spectrum is not larger than the threshold III. Thus, for this frequency band, the double-talk detection unit 14A detects that neither near-end speech nor a far-end speech are present.

In contrast, in the frequency bands circled with dotted lines in FIG. 14, the value of the input signal spectrum is not larger than the value of the frequency mask, and the value of the reference signal spectrum is larger than or equal to the threshold III. Thus, the double-talk detection unit 14A detects that single talk with only far-end speech is present and that there is no double-talk state.

The description will now return to FIG. 13. The echo suppressor 15A enables the echo suppress processing for frequency bands in which single talk with only far-end speech is detected and otherwise disables the echo pressing processing.

According to the present embodiment, the double-talk state can be accurately detected for each frequency band, and the echo suppress processing can be enabled for each frequency band.

Embodiments of the invention have been described in detail with reference to the drawings. However, specific configurations are not limited to the embodiments, and changes in the design or the like are also included within a scope which does not depart from the gist of the invention.

REFERENCE SIGNS LIST 1, 2, 3, 4, 5: Echo suppression device
11: Echo cancellation unit
12, 17: Frequency analyzer (FFT unit)
13: Frequency mask storage unit
14, 14A, 14B, 14C: Double-talk detection unit
15, 15A: Echo suppressor
16: Restoration unit (IFFT unit)
50: Terminal
51: Microphone
52: Speaker
53, 54: Cell phone
55: Speaker amplifier
100 Voice communication system

The invention claimed is:

1. An echo suppression device provided in a transmitting signal path through which a signal input from a microphone of a near-end terminal including a speaker and the microphone is transmitted, the echo suppression device comprising:
a frequency mask storage unit storing a frequency mask generated based on a power spectrum or an amplitude spectrum for a learning signal transmitted through the transmitting signal path when a sound is output from the speaker and only the output sound is input to the microphone;
a first spectrum calculation unit calculating an input signal spectrum that is a power spectrum or an amplitude spectrum for an input signal input from the microphone;
a double-talk detection unit detecting whether there is a double-talk state in which a signal is transmitted simultaneously to the transmitting signal path and to a receiving signal path through which a signal is transmitted to the speaker, based on a result of a comparison between a value of the input signal spectrum and a value of the frequency mask for each of different frequency bands; and
an echo suppressor executing processing of suppressing an echo in the input signal in a case where the double-talk detection unit detects that no signal is being transmitted through the transmitting signal path and that a signal is being transmitted through the receiving signal path.

2. The echo suppression device according to claim 1, further comprising an echo cancellation unit canceling a residual echo, wherein the frequency mask is generated based on the power spectrum or the amplitude spectrum for the learning signal in which the residual echo has been canceled by the echo cancellation unit, and
the first spectrum calculation unit calculates, as the input signal spectrum, the power spectrum or the amplitude spectrum for the input signal in which the residual echo has been canceled by the echo cancellation unit.

3. The echo suppression device according to claim 1, wherein the first spectrum calculation unit calculates, at regular intervals, the power spectrum or the amplitude spectrum for the learning signal, to determine a plurality of learning spectra, and the frequency mask storage unit acquires, for each frequency band, a maximum value of values of the plurality of learning spectra and designates the maximum value as the frequency mask.

4. The echo suppression device according to claim 1, wherein the double-talk detection unit compares a second threshold with a signal level of a reference signal transmitted through the receiving signal path, counts an excess number that is a number of frequency bands in which the value of the input signal spectrum is larger than the value of the frequency mask, and detects that no signal is being transmitted through the transmitting signal path and that a signal is being transmitted through the receiving signal path in a case where the excess number is smaller than or equal to a first threshold and the signal level of the reference signal is higher than or equal to the second threshold.

5. The echo suppression device according to claim 1, wherein the double-talk detection unit compares a second threshold with a signal level of a reference signal transmitted through the receiving signal path and detects that no signal is being transmitted through the transmitting signal path and that a signal is being transmitted through the receiving signal path in a case where, for frequency bands in which the value of the input signal spectrum is not larger than the value of the frequency mask, the signal level of the reference signal is higher than or equal to the second threshold.

6. The echo suppression device according to claim 1, further comprising a second spectrum calculation unit calculating a reference signal spectrum that is a power spectrum or an amplitude spectrum of a reference signal transmitted through the receiving signal path, wherein the double-talk detection unit compares the value of the reference signal spectrum with a third threshold, counts an excess number that is a number of frequency bands in which the value of the input signal spectrum is larger than the value of the frequency mask, and detects that no signal is being transmitted through the transmitting signal path and that a signal is being transmitted through the receiving signal path in a case where the excess number is smaller than or equal to a first threshold and where a frequency band is present in which the value of the reference signal spectrum is larger than the third threshold.

7. The echo suppression device according to claim 1, further comprising a second spectrum calculation unit calculating a reference signal spectrum that is a power spectrum or an amplitude spectrum of a reference signal transmitted through the receiving signal path, wherein the double-talk detection unit compares the value of the reference signal spectrum with a third threshold, and for a frequency band in which the value of the input signal spectrum is smaller than the value of the frequency mask and in which the value of the input signal spectrum is not larger than the value of the frequency mask, detects that no signal is being transmitted through the transmitting signal path and that a signal is being transmitted through the receiving signal path.

8. An echo suppression method comprising the steps of:
when a sound is output from a speaker of a near-end terminal and only the output sound is input to a microphone of the near-end terminal, generating a frequency mask based on a power spectrum or an amplitude spectrum for a learning signal transmitted through a transmitting signal path through which a signal input from the microphone is transmitted and storing the generated frequency mask;

calculating an input signal spectrum that is a power spectrum or an amplitude spectrum for an input signal input from the microphone;

comparing, for each of different frequency bands, a value of the calculated input signal spectrum with a value of the stored frequency mask to detect whether there is a double-talk state in which a signal is transmitted simultaneously to a transmitting signal path through which a signal input from the microphone is transmitted and to a receiving signal path through which a signal is transmitted to the speaker; and executing echo suppress processing of suppressing an echo in the input signal in a case of detecting that no signal is being transmitted through the transmitting signal path and that a signal is being transmitted through the receiving signal path.

9. An A non-transitory computer readable medium storing a program, which causes a computer to execute steps of:

storing a frequency mask generated based on a power spectrum or an amplitude spectrum for a learning signal transmitted through a transmitting signal path when a sound is output from a speaker and only the output sound is input to a microphone;

calculating an input signal spectrum that is a power spectrum or an amplitude spectrum for an input signal input from the microphone;

detecting whether there is a double-talk state in which a signal is transmitted simultaneously to the transmitting signal path and to a receiving signal path through which a signal is transmitted to the speaker, based on a result of a comparison between a value of the input signal spectrum and a value of the frequency mask for each of different frequency bands; and executing processing of suppressing an echo in the input signal in case where no signal which is transmitted through the transmitting signal path is detected and that a signal, which is transmitted through the receiving signal path is detected.

* * * * *